United States Patent [19]
Grosskinsky et al.

[11] Patent Number: 4,457,906
[45] Date of Patent: Jul. 3, 1984

[54] PREPARATION OF HYDROXYLAMMONIUM SALTS

[75] Inventors: Otto-Alfred Grosskinsky; Elmar Frommer; Guenther Rapp, all of Ludwigshafen; Erwin Thomas, Freinsheim, all of Fed. Rep. of Germany

[73] Assignee: BASF Aktiengesellschaft, Fed. Rep. of Germany

[21] Appl. No.: 399,209

[22] Filed: Jul. 19, 1982

[30] Foreign Application Priority Data

Jul. 31, 1981 [DE] Fed. Rep. of Germany ....... 3130305

[51] Int. Cl.$^3$ .............................................. C01B 21/14
[52] U.S. Cl. ..................................... 423/387; 423/388
[58] Field of Search ................................. 423/387, 388

[56] References Cited

U.S. PATENT DOCUMENTS

| 2,719,778 | 10/1955 | Jockers et al. | 23/290 |
| 3,406,011 | 10/1968 | Zirngibl et al. | 423/388 |
| 3,484,214 | 12/1969 | Gehring et al. | 23/288 |
| 4,048,291 | 9/1977 | El-Ghatta et al. | 423/387 |

FOREIGN PATENT DOCUMENTS

| 8479 | 6/1981 | European Pat. Off. | 423/387 |
| 885396 | 11/1967 | Fed. Rep. of Germany | 423/387 |
| 920963 | 4/1968 | Fed. Rep. of Germany | 423/387 |
| 945752 | 10/1968 | Fed. Rep. of Germany | 423/387 |
| 956038 | 7/1969 | Fed. Rep. of Germany | 423/387 |
| 968363 | 11/1969 | Fed. Rep. of Germany | 423/387 |
| 1088037 | 4/1971 | Fed. Rep. of Germany | 423/387 |
| 2736872 | 2/1979 | Fed. Rep. of Germany | 423/387 |
| 7902291 | 2/1973 | Netherlands | 423/387 |
| 453316 | 4/1965 | Switzerland | 423/387 |

OTHER PUBLICATIONS

Perry, *Chemical Engineers' Handbook*, Fifth Edition, (1973), McGraw-Hill Book Co., pp. 19-24, through 19-26.
Kirk-Othmer, *Encyclopedia of Chemical Technology*, Second Edition, vol. 9, McGraw-Hill Book Co., (1964), pp. 898, 899.
J. Amer. Chem. Soc., vol. 78, (1956), pp. 4202-4205.

*Primary Examiner*—John Doll
*Assistant Examiner*—Wayne A. Langel
*Attorney, Agent, or Firm*—Keil & Weinkauf

[57] ABSTRACT

Hydroxylammonium salts are prepared by an improved process, wherein nitric oxide is reduced catalytically with hydrogen in a dilute aqueous solution of a mineral acid in the presence of a suspended supported platinum catalyst and at elevated temperatures, and wherein the improvement comprises avoiding the formation of foam at the surface of the reaction mixture.

1 Claim, No Drawings

PREPARATION OF HYDROXYLAMMONIUM SALTS

The present invention relates to a process for the preparation of hydroxylammonium salts by catalytic reduction of nitric oxide with hydrogen in a dilute aqueous solution of a mineral acid in the presence of a suspended supported platinum catalyst and at elevated temperatures.

The catalytic reduction of nitric oxide with hydrogen gives not only hydroxylamine but also, among other by-products, nitrous oxide. Apart from the fact that the formation of by-products is undesirable, nitrous oxide forms an explosive mixture with hydrogen and nitric oxide, particularly when the reaction is carried out under super-atmospheric pressure. European Patent Application No. 0,008,479 discloses that admixing from 10 to 80% by volume of nitrogen to the starting gas mixture in the preparation of hydroxylamine by catalytic reduction of nitric oxide ensures that the gas mixture obtained is not explosive. However, such a procedure has the disadvantages that the exit gas obtained can no longer be utilized and, in addition, that the reaction rate is adversely affected.

It is an object of the present invention to provide a process for the preparation of hydroxylammonium salts by catalytic reduction of nitric oxide, wherein the formation of nitrous oxide is reduced without the reaction rate being adversely affected.

We have found that this object is achieved by a process for the preparation of hydroxylammonium salts by catalytic reduction of nitric oxide with hydrogen in a dilute aqueous solution of a mineral acid in the presence of a suspended supported platinum catalyst and at elevated temperatures, wherein the formation of a foam on the surface of the reaction mixture is suppressed.

The novel process has the advantages that the formation of nitrous oxide is avoided in a simple manner and that high yields are obtained.

As a rule, the molar ratio of hydrogen to nitric oxide is from 1.5:1 to 6:1, and particularly good results are obtained when a molar ratio of from 3.5:1 to 5:1 is maintained in the reaction zone.

It is advantageous to use a strong mineral acid, eg. hydrochloric acid, nitric acid, sulfuric acid or phosphoric acid, as the acid. The acidic salts thereof, eg. ammonium bisulfate, are also suitable. Sulfuric acid and ammonium bisulfate are particularly preferred. As a rule, a 4–6 N aqueous acid is used initially, and the acid concentration is not permitted to fall below 0.2 N during the reaction.

For the purposes of the invention, the reaction mixture is the above aqueous solution of an acid, which additionally contains the hydroxylammonium salt, by-products, the catalyst and dissolved gases. The reaction is advantageously carried out at from 30 to 80° C., particularly advantageously from 40 to 60° C. As a rule, the reaction is carried out under atmospheric or super-atmospheric pressure, eg. not more than 200 bar, particularly advantageously under super-atmospheric pressure, eg. from 1.5 to 20 bar.

The reaction is carried out in the presence of a supported platinum catalyst. Platinum on a charcoal carrier, especially on graphite, has proved particularly suitable. A supported catalyst of this type preferably contains from 0.2 to 5% by weight of platinum, and advantageously contains, in addition, one or more elements of main groups 5 and/or 6 of the periodic table, with an atomic weight of $>30$, as well as lead and/or mercury as poisons. Suitable catalysts and their preparation are described, for example, in German Pat. Nos. 920,963, 956,038, 945,752 and 1,088,037. During the reaction, the supported catalyst is present as a suspension in the reaction solution.

As a rule, the reaction is carried out as follows: nitric oxide and hydrogen are passed, from below, into the aqueous mineral acid containing the suspended supported platinum catalyst, and uniform distribution is effected by mechanical means, for example by stirring or cycling the reaction mixture. The unreacted gases separate out to form a cushion above the reaction mixture, and a foam zone forms at the surface for reasons which are not understood. An essential characteristic of the invention is that the formation of foam, ie. the foam zone on the surface of the reaction mixture, is avoided or at least substantially suppressed. The measures described below, which may be applied individually or in combination, are suitable for this purpose.

Advantageously, the supported platinum catalyst used contains less than 10% by weight of particles having a size of $<10$ $\mu$, and a particle size of from 30 to 90 $\mu$ has proved particularly suitable. The fine particles of the catalyst can be readily removed by suitable measures, for example sieving.

Another possible means of avoiding, or at least substantially suppressing, the formation of a foam zone comprises spraying the surface continuously with liquid by means of a suitable stirrer, for example a paddle stirrer which is only partially immersed, and breaking up the foam mechanically. In addition, it is advantageous to spray the surface of the reaction mixture, on which a foam zone is forming, continuously with reaction mixture which, for example, has been cycled, and/of with fresh mineral acid.

Another possible method comprises adding antifoams to the reaction mixture. Examples of suitable antifoams are $C_6$-$C_{10}$ alkanols, alkoxylated $C_6$-$C_{10}$ alkanols, copolymers of acrylamide with sodium acrylate or acrylic acid esters, and polymeric reaction products of acrylic acid esters and aminoalcohols.

The amount of surfactants to be added may be readily determined by preliminary experiments. As a rule, it is sufficient to add from 1 to 10 ppm, based on the reaction mixture.

German Pat. No. 968,363, Example 1, and J. Amer. Chem. Soc., 78 (1956), 4202, disclose that in the preparation of hydroxylamine by catalytic hydrogenation of nitric oxide in an acidic medium by either a batchwise or a continuous procedure the gaseous starting materials are mixed before being fed into the reaction mixture. It was therefore to be expected that high yields and high space/time yields would be obtained only when ideally premixed gases were used. In an advantageous procedure, hydrogen and nitric oxide are fed separately to the reaction mixture, and this method has proved particularly suitable when superatmospheric pressure is used. In view of the prior art, it is surprising that high yields and space/time yields are also obtained when the starting gases are not premixed.

Hydroxylammonium salts are used for the preparation of oximes, eg. cyclohexanone oxime, which is a starting material for the preparation of caprolactam.

The Examples which follow illustrate the process according to the invention.

EXAMPLE 1

5 l of 4.1 N sulfuric acid and 500 g of a platinum/graphite catalyst containing 0.5% by weight of platinum and having a particle size of 30–90 μ are introduced into a stainless steel pressure vessel. The catalyst is suspended by stirring the mixture with a combination of a paddle stirrer and a cage stirrer, the paddle stirrer being only partially immersed in the liquid. 740 l of hydrogen and 425 l of nitric oxide are fed in separately from below in the course of 45 minutes. The reaction is carried out under a pressure of 9 bar, and the reaction mixture is kept at 40° C. by cooling. The surface of the reaction mixture is sprayed continuously with the reaction mixture by means of the partially immersed paddle stirrer, and the formation of a foam zone is thus suppressed. Unreacted gases are taken off via a pressure-relief valve. When the sulfuric acid has almost been consumed, the reaction is interrupted and the reaction mixture is let down. The table below gives more details:

TABLE

|  | Example | | |
| --- | --- | --- | --- |
|  | 1a | 1b | 1c |
| Pressure | 9 | 9 | 9 |
| Reaction time (minutes) | 45 | 45 | 45 |
| Final concentration of the reaction solution, N $H_2SO_4$ | 0.38 | 0.33 | 0.41 |
| Amount of unreacted NO (moles) | 17.9 | 17.8 | 17.8 |
| Amount of $NH_2OH$ formed (g) | 525.7 | 553.9 | 533.2 |
| $NH_2OH$ yield (%, based on unreacted NO) | 88.9 | 94.2 | 94.4 |
| $NH_3$ (%) | 8.0 | 3.8 | 3.3 |
| $N_2O$ (%) | 3.2 | 2.0 | 2.3 |
| Space/time yield | 4.68 | 4.48 | 4.47 |

EXAMPLE 2

5 l of 4.3 N sulfuric acid and 40 g, per l of sulfuric acid, of a supported platinum/graphite catalyst containing 0.5% by weight of platinum are introduced into a bubble column of 6 cm diameter. 130 l of hydrogen and 76 l of nitric oxide are passed into the bubble column from below in the course of 180 minutes. In addition, 15 mg (3 ppm) of a copolymer of acrylamide and sodium acrylate are added to the mixture. A pressure of 1 bar and a temperature of 40° C. are maintained during the reaction. No foam zone forms in the course of the reaction. The yield of hydroxylamine is 86%, based on unreacted nitric oxide, and the amount of nitrous oxide formed, and present in the gas phase, is 2%.

If the reaction is carried out as described above but in the absence of antifoams, a foam zone forms at the surface of the reaction mixture. The yield of hydroxylamine falls to 55% by weight and the amount of nitrous oxide in the gas phase increases to 30%.

We claim:

1. In a process for the preparation of hydroxylammonium salts by catalytic reduction of nitric oxide with hydrogen in a dilute aqueous solution of a mineral acid in the presence of a suspended supported platinum catalyst and at elevated temperatures, the improvement wherein the reaction is carried out under superatmospheric pressure, hydrogen and nitric oxide are fed separately into the reaction mixture, and the supported platinum catalyst used contains less than 10% by weight of particles having a size of less than 10μ.

* * * * *